United States Patent [19]
Harada

[11] Patent Number: 5,901,803
[45] Date of Patent: May 11, 1999

[54] LOCK STRUCTURE FOR A BONNET

[75] Inventor: Shigeo Harada, Amagasaki, Japan

[73] Assignee: Kanzaki Kokyukoki Mfg. Co., Ltd., Hyogo-Ken, Japan

[21] Appl. No.: 08/701,179

[22] Filed: Aug. 21, 1996

[30] Foreign Application Priority Data

Aug. 21, 1995 [JP] Japan ................................. 7-211728

[51] Int. Cl.$^6$ ............................................... B62D 25/10
[52] U.S. Cl. .................................. 180/69.2; 180/69.21
[58] Field of Search ............................. 180/68.5, 69.2, 180/69.21, 69.24; 224/400, 488; 429/96, 100; 70/240, 241; 296/194, 196; 292/DIG. 14, 336.3, 123, 126

[56] References Cited

U.S. PATENT DOCUMENTS

| | | | |
|---|---|---|---|
| 2,197,648 | 4/1940 | Mersheimer | 180/69.21 |
| 2,312,578 | 3/1943 | Northrup et al. | 292/DIG. 14 |
| 2,662,794 | 12/1953 | Lindsay | 296/194 |
| 3,392,557 | 7/1968 | Solow | 70/240 |
| 3,520,159 | 7/1970 | Swanney | 70/241 |
| 4,267,895 | 5/1981 | Eggert | 180/68.5 |
| 4,456,289 | 6/1984 | Badiali | 292/DIG. 14 |
| 4,914,802 | 4/1990 | Takao et al. | 296/196 |
| 5,000,493 | 3/1991 | Bastien | 292/336.3 |
| 5,215,157 | 6/1993 | Teich | 180/69.24 |
| 5,538,097 | 7/1996 | Stauffer et al. | 180/69.21 |
| 5,718,303 | 2/1998 | Ogasawara et al. | 180/69.21 |
| 5,803,198 | 9/1998 | Baxtor et al. | 180/69.21 |

FOREIGN PATENT DOCUMENTS

| | | | |
|---|---|---|---|
| 1173795 | 3/1959 | France | 180/69.21 |
| 57-88858 | 6/1982 | Japan . | |
| 61-90672 | 6/1986 | Japan . | |
| 63-51064 | 4/1988 | Japan . | |
| 3-24978 | 3/1991 | Japan . | |
| 5-80973 | 11/1993 | Japan . | |

*Primary Examiner*—Lanna Mai
*Assistant Examiner*—Faye M. Fleming
*Attorney, Agent, or Firm*—Sterne, Kessler, Goldstein & Fox P.L.L.C.

[57] ABSTRACT

A bonnet for a vehicle having rotary fulcrums provided at the rear side thereof to lock the front side of the same and for containing a battery at the front thereof. Side plates are provided at both sides of the battery. A connecting arm is vertically, pivotally mounted to the side plates. Catch arms are fixed at both sides of the connecting arm so as to reliably lock the front side of the bonnet. The connecting arm is L-like-shaped when viewed in plan and surrounds the outer periphery of the battery so that the locking device is not positioned in front of or above the battery. The bonnet is lower at the front of the vehicle to facilitate maintenance or exchange of the battery without interference with the locking device.

5 Claims, 4 Drawing Sheets

LOCK STRUCTURE FOR A BONNET

FIELD OF THE INVENTION

The present invention relates to a lock structure for a bonnet for housing therein and covering an engine for a vehicle. The bonnet is provided with fulcrums at the rear of an upper cover, so that the front of the bonnet can be rotated upwardly to open. A locking device is disposed at the front of the bonnet, so as to securely lock the upper cover when closed.

BACKGROUND OF THE INVENTION

Conventionally, it is well known that a bonnet for covering an engine and a battery disposed in the front side of a tractor can be made to open or close around the front side of the vehicle. Alternatively, a rear fulcrum and a locking device can be provided at the side opposite to the rotary fulcrum of the bonnet. For example, Japanese Utility Model Laid-Open Gazette No. Sho. 57-88858 discloses that the bonnet can open or close using the front portion as the fulcrum. At the rear of the bonnet, a one-sided control member, connected to a left and a right retaining member by a left and a right link, can release the lock. Also, Japanese Utility Model Laid-Open Gazettes Nos. Sho 61-90672, Sho 63-51064, Hei 3-24978 and Hei 5-80973, disclose that the front of a bonnet can be made to open or close using the rear portion as the fulcrum. A controlling knob can be provided with an engaging portion provided under or inside thereof, above the center of the front of the bonnet or at the center of the front surface, so that the controlling knob is operated to release the lock.

However, where the rotary fulcrum is provided at the front of the bonnet, and the battery is disposed at the front of the engine space, when the battery is changed or maintenance work is performed, in order to remove the battery, a worker must raise the bonnet while avoiding contact between the battery and the bonnet, or he must put his head into a restricted space while working, thereby making the work difficult to carry out. Where the rotary fulcrum is provided at the rear of the bonnet, the radiator must be raised and removed in order to perform maintenance of the battery. Also, where the lock control member or the locking device is positioned at the center of the front of the bonnet, the front of the bonnet is raised, to ensure that there is space to dispose the locking device around a headlight, thus narrowing the field of view and causing the bonnet to be larger.

SUMMARY OF THE INVENTION

An object of the present invention is to provide a locking mechanism for locking an upper cover mounted to the bonnet in the closed position and disposing rotary fulcrums at the rear thereof, provided on one or both sides of the battery contained in the bonnet, so that no locking mechanism is provided at the front of the battery. This allows the battery to be easily removed horizontally from the inside of the bonnet. Since at least one lock mechanism is provided at one or both sides of the battery, a space is formed in the upper portion of the bonnet, whereby it is possible to lower the front of the bonnet, thereby widening the field of view, or to dispose a headlight just above the battery.

The above and other objects and novel features of the invention will more fully appear from the following detailed description when the same is read in connection with the accompanying drawings.

DETAILED DESCRIPTION OF THE PREFERRED EMBODIMENTS

Figure 1:
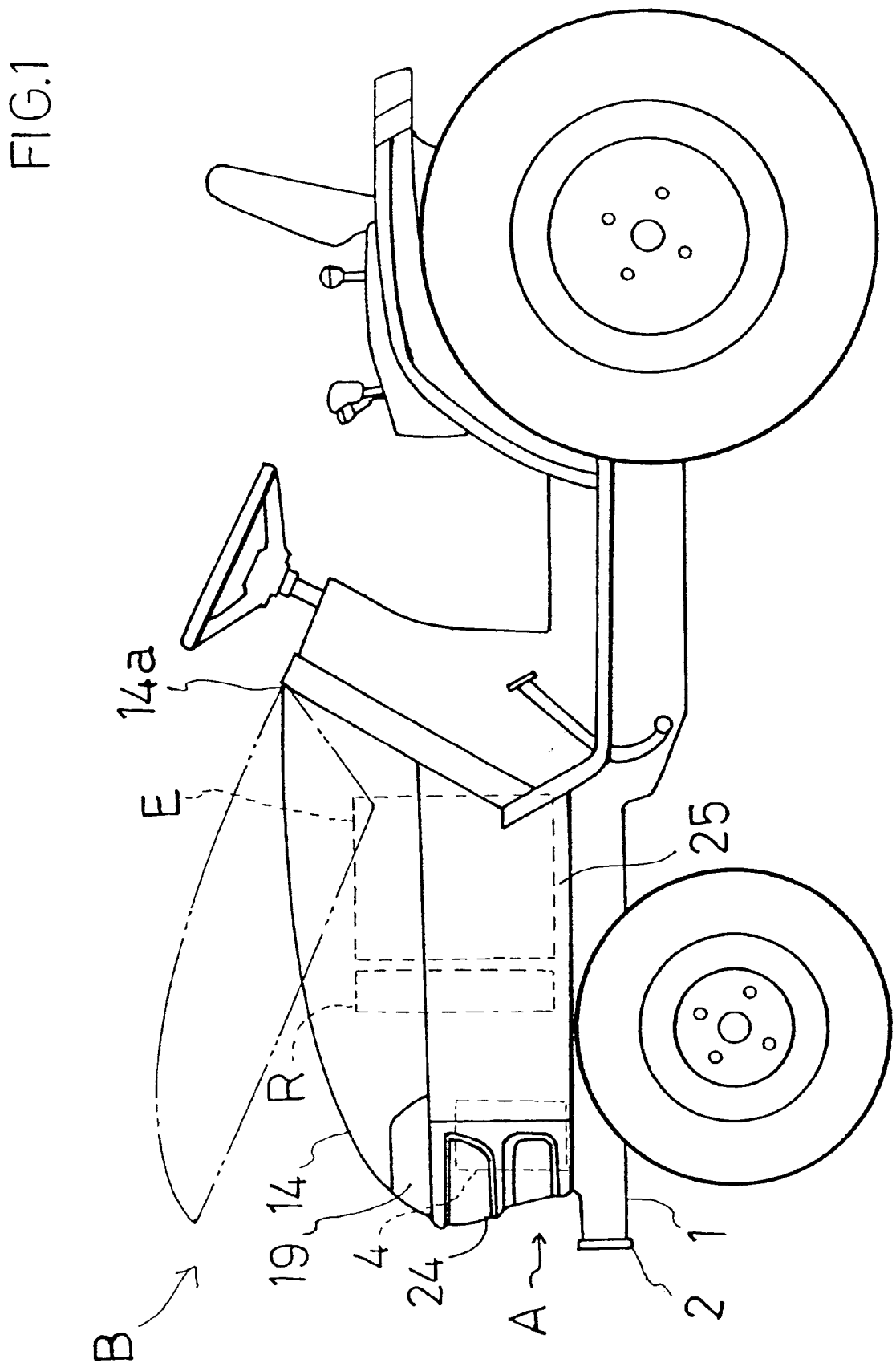
FIG. 1 is a side view of a tractor of the present invention.

In FIG. 1, an engine E is loaded on an engine frame 1 at the front of a tractor. A bumper 2 is formed at the front end of engine frame 1. A containing portion A for a battery 4 is formed on the engine frame 1. Locking devices of the present invention are disposed at both sides of containing portion A. A radiator R is disposed at the rear side of containing portion A. Engine E is disposed behind radiator R.

Figure 2:
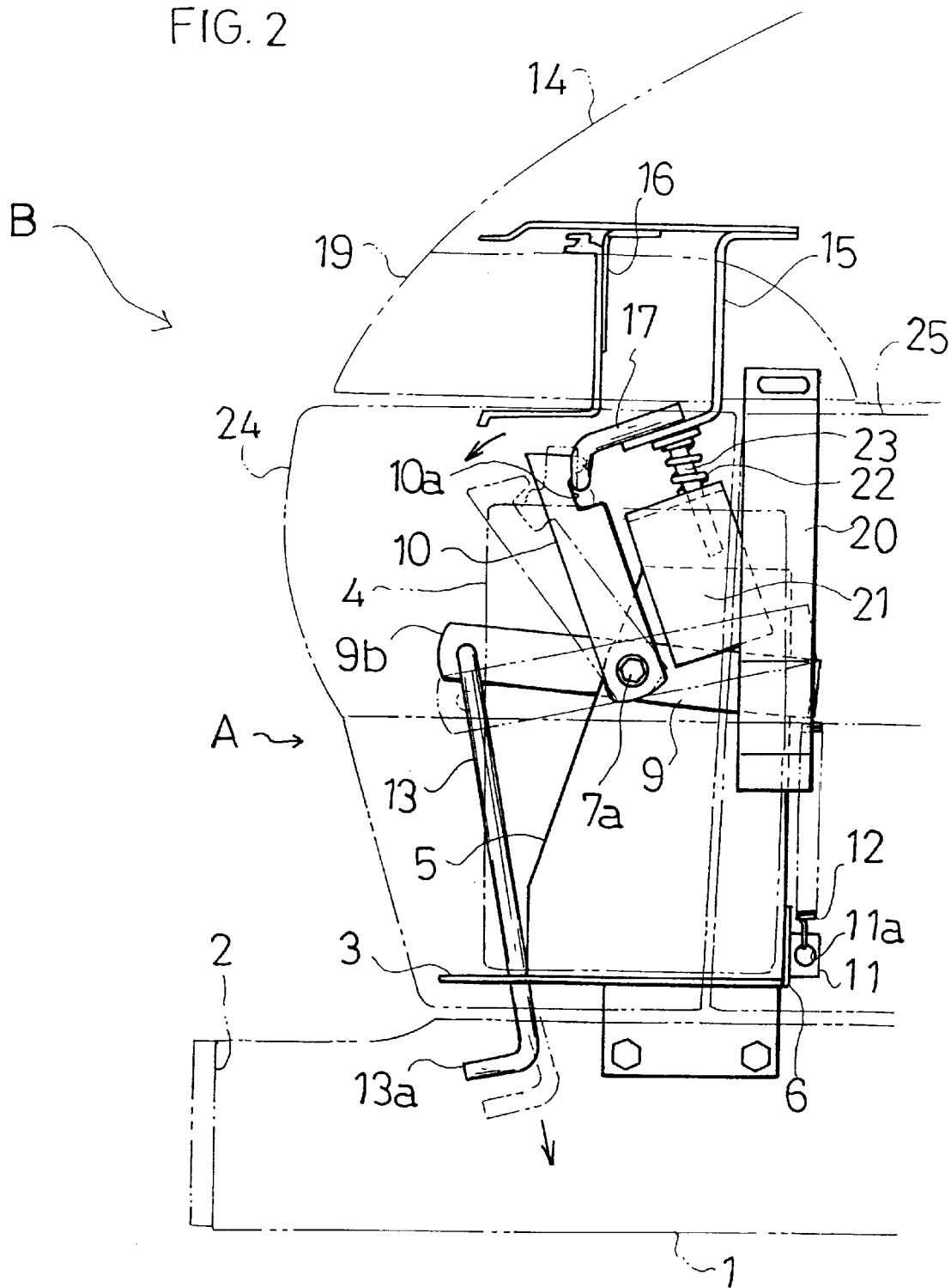
FIG. 2 is a side view showing a lock mechanism of the present invention, disposed within a bonnet.
Figure 3:
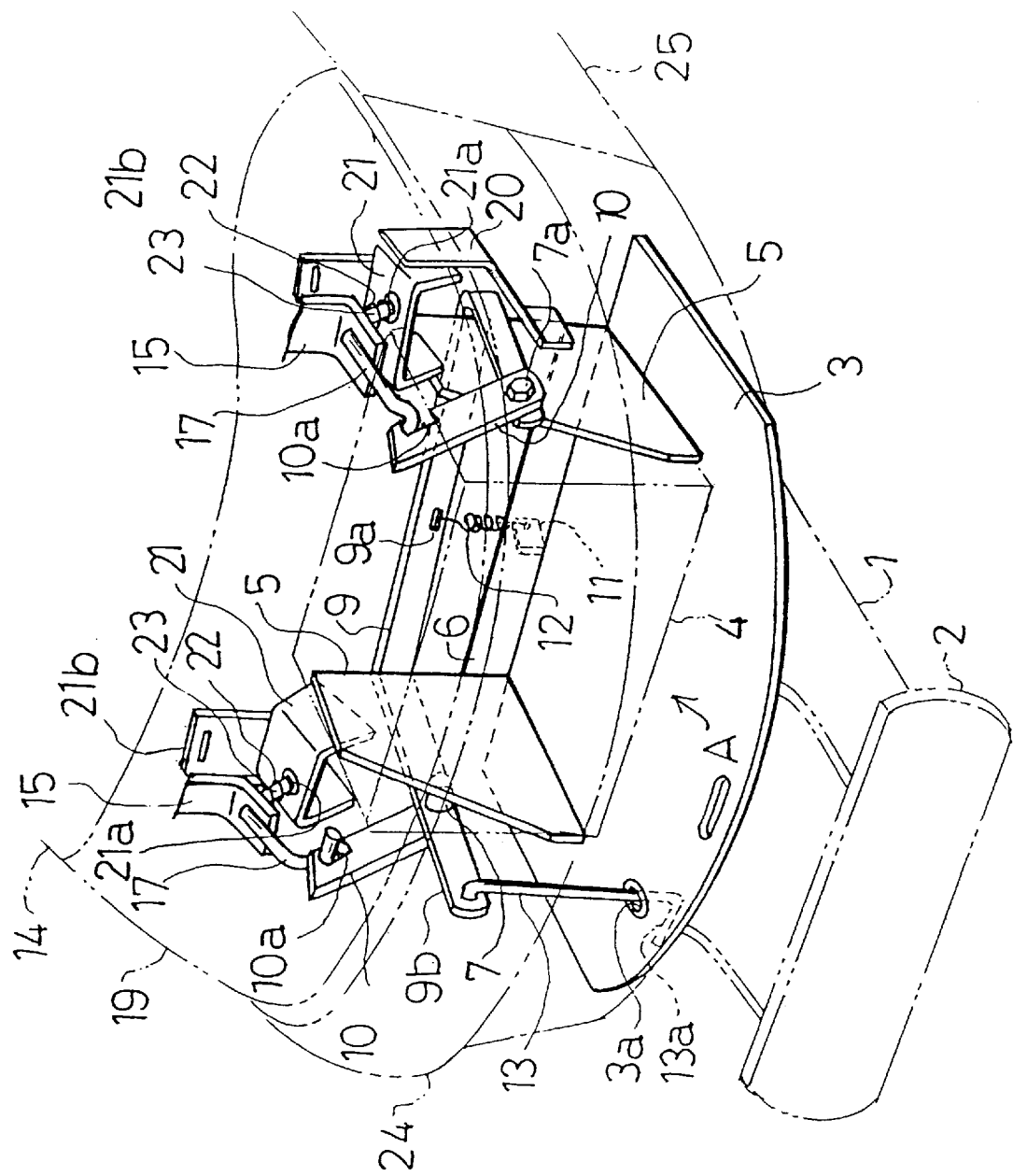
FIG. 3 is a perspective view of the same.
Figure 4:
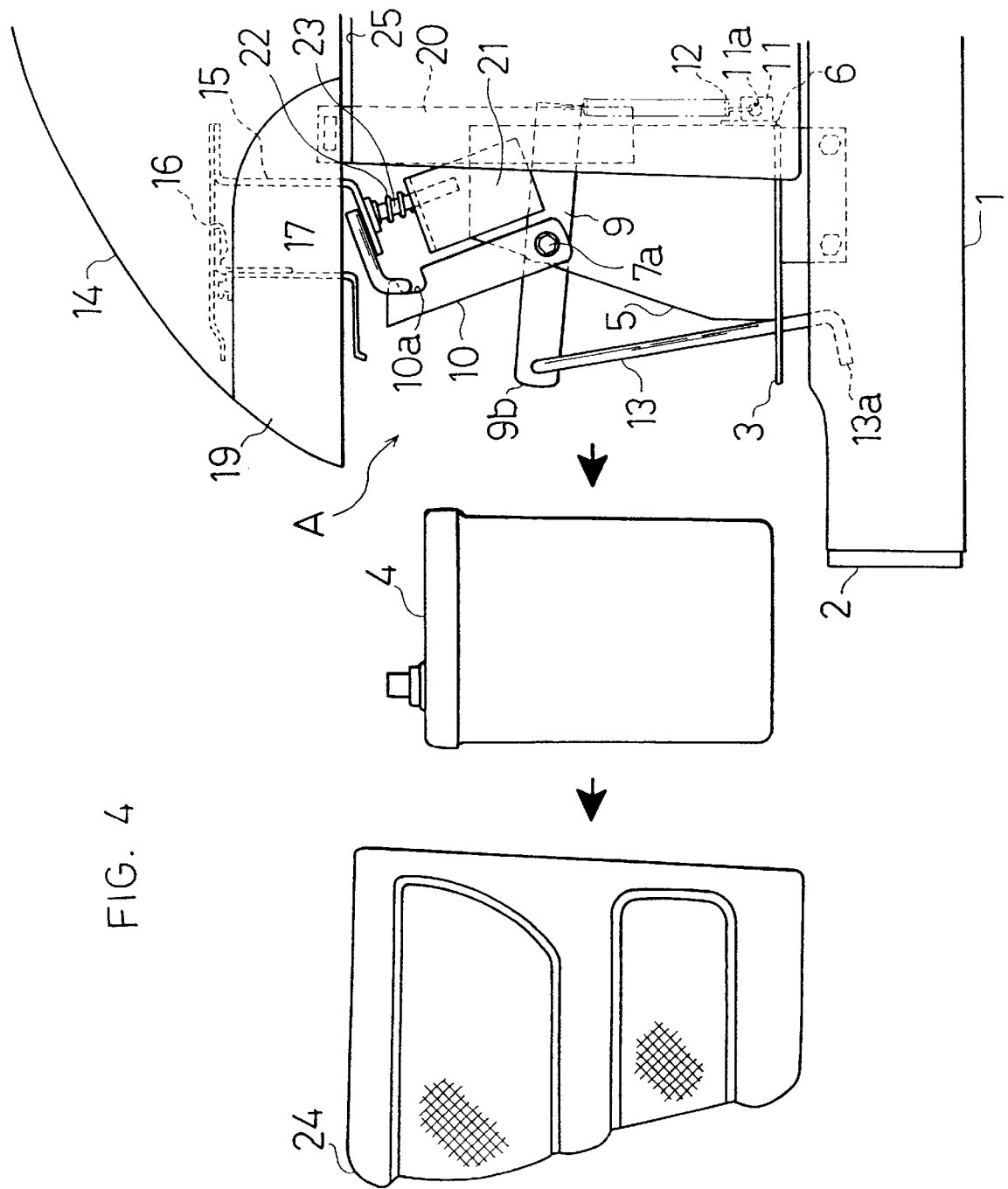
FIG. 4 is a side view showing the battery and a grille removed from the bonnet.

As shown in FIGS. 2 and 3, battery containing portion A comprises a loading plate 3, side plates or stands 5, and a rear plate 6. Loading plate 3 is fixed on the front side of engine frame 1. Side plates 5 are provided at both sides of battery 4 and are erected on loading plate 3 corresponding to the width of battery 4. Rear plate 6 is fixed to the rear surface of loading plate 3 and to the lower portion of the rear surface of each side plate 5 so that rear plate 6 can be positioned at the rear end of battery 4.

A connecting arm 9, formed of a band bent in a generally elongated U-like shape when viewed in plan, surrounds the rear surface and left and right side surfaces of battery containing portion A. Connecting arm 9 is open in front and is pivotally mounted at both distal ends to side plates 5 by bolts 7a. A retaining bore 9a is open at the lateral center of connecting arm 9. Additionally, a stay 11 is rearwardly erected at the lateral center of the rear surface of rear plate 6. A retaining bore 11a is open at stay 11, and a spring 12 is interposed between the retaining bores 11a and 9a so as to downwardly bias connecting arm 9. The biasing force rotates connecting arm 9 downwardly around pivotal portions 7 as a fulcrum, and brings into contact the corners of the base of connecting arm 9 with the rear surfaces of side plates 5, which act as stoppers, whereby, rotation of connecting arm 9 is regulated to stop at a locked position.

In this embodiment, one end 9b of connecting arm 9, which is at the right side of the vehicle when viewed from the rear, extends forwardly from pivotal portion 7. The upper end of a release lever 13 is retained to the distal end of arm 9b. Release lever 13 is L-like-shaped when viewed from the front. The lower end is used as a handle 13a and perforates through a through-bore 3a formed at the front side of loading plate 3, so that release lever 13 is downwardly pulled from under the loading plate 3, thereby enabling connecting arm 9 to be unlocked.

Catch arms 10 are fixed at the lower ends thereof to the pivotal portions 7 of connecting arm 9 and extend at the upper ends to the vicinity of the upper end of battery 4. At the upper portions of the rear surfaces of catch arms 10 are formed engaging recesses 10a which open rearwardly. The upper end of each catch arm 10 is not flat but is formed with an acute angle, so that when an upper cover 14 of bonnet B is closed, each retaining rod 17 (discussed below) may be guided into an engaging recess 10a.

A rotary fulcrum 14a (see FIG. 1) is provided at the rear portion of upper cover 14 of bonnet B containing therein engine E and battery 4. At both sides of the front of the inner surface of upper cover 14 are fixed abutting plates 15, positioned corresponding to catch arms 10. Retaining rods 17, of L-like shape when viewed in plan, project forwardly from the utmost ends of abutting plates 15, so that retaining rods 17 may engage, at the horizontal portions thereof, with engaging recesses 10a of catch arms 10. Thus, the locking mechanisms are constituted at both sides of battery containing portion A.

Mounting plates 16 are fixed at the upper surfaces of abutting plates 15. Headlights 19 are mounted on mounting plate 16 so that headlights 19 are disposed in the upper space of battery containing portion A.

Reinforcing braces 20 are provided at the position on the outer surfaces of side plates 5 not interfering with the rotation of connecting arm 9. Braces 20 and side plates 5 are connected with each other by welding or the like. Receiving plates 21, which are formed in a generally elongated U-like shape when viewed from the front of the vehicle, are fixed by welding between braces 20 and side plates 5. Fixing members 21b, supported in front of the radiator, are fixed to receiving plates 21. At the upper surfaces of receiving plates 21 are open bolt bores 21a. Abutting pins 23, on which springs 22 are fitted, are slidably inserted into bolt bores 21a so as to project upwardly. Abutting pins 23 are disposed so that the upper surfaces thereof come in contact with the lower surfaces of abutting plates 15. Therefore, when upper cover 14 is closed, abutting pins 23 initially contact with abutting plates 15, whereby the biasing force of each spring 22 absorbs the impact caused when closed. Also, when unlocked by operation of release lever 13 (discussed below), the biasing force of each spring 22 slightly raises cover 14, thereby enabling a worker to easily put his fingers therein for opening upper cover 14.

A grille 24 is detachably provided on bonnet B by proper retaining means in a manner that it covers the front surface of battery containing portion A under the front side of upper cover 14 and is adapted to be removed when the battery is to be taken out. In addition, grille 24 may be integral with the front ends of bonnet B, so that, when upper cover 14 is open, the front of battery 4 may also be open. Side covers 25 are disposed at both sides of the rear of grille 24 so as to cover the engine. In other words, bonnet B comprises the upper cover 14, side covers 25 and grille 24.

In the above-mentioned structure, when handle 13a of release lever 13 is pulled downwardly, connecting arm 9 is rotated around the pivotal portions 7 so as to forwardly rotate the left and right catch arms 10. Restraining rods 17 disengage from retaining recesses 10a, whereby the biasing force of springs 22 slightly raise abutting plates 15. Furthermore, when handle 13a of release lever 13 is released, the biasing force of spring 12 pulls the rear portion of connecting arm 9 downwardly, which brings into contact the rear surface thereof with side plates 5 so as to restore to the structure to the former condition. At which time, retaining rods 17 are positioned above the upper ends of catch arms 10 and put in the unlocked state, whereby upper cover 14 of bonnet B can be rotated upwardly and rearwardly to be opened. In this open state, battery 4 is accessible from above, and maintenance work therefore can be carried out with ease. Upper cover 14, when closed, is released to a certain extent from the open state and then lowered, or is further downwardly pressed from the lowered state, whereby retaining rods 17 lower against the biasing force of spring 22 to engage with retaining recesses 10a and become locked.

When it is desired that battery 4 be taken out, because the locking device of the battery containing portion A (connecting arm 9 and catch arms 10) is disposed in a generally elongated U-like shape when viewed in plan, grille 24 can be removed and the leads can be removed from the terminals of battery 4. Thus, battery 4 can be easily removed from the vehicle by shifting it forwardly, without having to raise it.

While one embodiment of the invention has been shown and described, this embodiment is merely exemplary and the invention is not limited to the specific construction thereof.

What is claimed is:

1. A locking mechanism for a bonnet of a working vehicle including an upper cover and a rotary fulcrum disposed at the rear of said upper cover, comprising:

a retaining member provided on said upper cover;

a pair of side plates provided within said bonnet, each side plate of said pair adapted to be provided adjacent to a side of a battery disposed in said bonnet;

a vertically rotatable connecting arm having a pair of pivotal points, each point connected to one of said side plates; and a catch arm connected to said connecting arm, and being capable to be connected and unconnected to said retaining member.

2. A locking mechanism according to claim 1, wherein said connecting arm is substantially U shaped, surrounds the left, right and rear sides of said battery, and is open at the front thereof.

3. A bonnet for a working vehicle comprising:

an upper cover;

a rotary fulcrum disposed at the rear of said upper cover adapted to connect said cover to the vehicle;

a pair of side covers disposed at left and right sides of said upper cover; and a front cover detachably provided on the vehicle adapted to be in front of a battery disposed in said bonnet for protecting a front side of said side covers and said upper cover;

wherein said front cover is removable from said side covers to permit said battery to be taken out substantially horizontally from said vehicle.

4. A bonnet according to claim 3, further including a locking mechanism comprising:

a retaining member provided on said upper cover;

a stand provided at a lateral side of said battery; and a catch arm vertically pivotally mounted to said stand.

5. A bonnet according to claim 4, further comprising:

a connecting arm vertically pivotally mounted in said bonnet and having a pivotal point connected to said sideplate; and a catch arm connected to said connecting arm;

wherein said connecting arm is generally a substantially elongated U shape, surrounds the left, right, and rear sides of said battery, and is open at the front thereof.

* * * * *